US010511500B2

(12) United States Patent
Shimoda et al.

(10) Patent No.: US 10,511,500 B2
(45) Date of Patent: Dec. 17, 2019

(54) ESTIMATION DEVICE, ESTIMATION METHOD, AND RECORDING MEDIUM

(71) Applicant: NIPPON TELEGRAPH AND TELEPHONE CORPORATION, Chiyoda-ku (JP)

(72) Inventors: Akihiro Shimoda, Musashino (JP); Keisuke Ishibashi, Musashino (JP); Takeru Inoue, Musashino (JP); Kazumichi Sato, Musashino (JP); Tatsuya Mori, Shinjuku (JP); Shigeki Goto, Shinjuku-ku (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 135 days.

(21) Appl. No.: 15/550,966

(22) PCT Filed: Feb. 16, 2016

(86) PCT No.: PCT/JP2016/054373
§ 371 (c)(1),
(2) Date: Aug. 14, 2017

(87) PCT Pub. No.: WO2016/133064
PCT Pub. Date: Aug. 25, 2016

(65) Prior Publication Data
US 2018/0026862 A1    Jan. 25, 2018

(30) Foreign Application Priority Data
Feb. 17, 2015   (JP) ................................. 2015-028744

(51) Int. Cl.
*H04L 12/26*      (2006.01)
*H04L 29/12*      (2006.01)

(52) U.S. Cl.
CPC ........ *H04L 43/045* (2013.01); *H04L 61/1511* (2013.01); *H04L 61/2007* (2013.01)

(58) Field of Classification Search
None
See application file for complete search history.

(56) References Cited

U.S. PATENT DOCUMENTS

2002/0105911 A1    8/2002   Pruthi et al.
2005/0270984 A1   12/2005   Kodialam et al.
(Continued)

FOREIGN PATENT DOCUMENTS

JP    2005-348416 A    12/2005
JP    2006-13876 A      1/2006
(Continued)

OTHER PUBLICATIONS

International Search Report dated Apr. 26, 2016 in PCT/JP2016/054373 filed Feb. 16, 2016.
(Continued)

*Primary Examiner* — Joshua Joo
(74) *Attorney, Agent, or Firm* — Oblon, McClelland, Maier & Neustadt, L.L.P.

(57) ABSTRACT

An estimation device is provided that measures a number of DNS requests for each of a plurality of domain names and for each IP address in observed flows. The device measures a total number of the flows, and total amounts of data, estimates a relationship between the amount of data for each IP address corresponding to a node, and the number of DNS requests for each domain name corresponding to a non-intermediate node; and based on a value obtained by multiplying the number of requests for each domain name by the amount of data for each flow of each domain name, obtains the amount of data for each flow of each domain name, multiplies the amount of data by the number of the DNS
(Continued)

requests for each domain name, so as to calculate an estimate of the amount of data for each domain name.

7 Claims, 10 Drawing Sheets

(56) References Cited

U.S. PATENT DOCUMENTS

| | | | |
|---|---|---|---|
| 2005/0270985 A1 | 12/2005 | Hao et al. | |
| 2016/0149949 A1* | 5/2016 | Labrou | H04L 47/2441 726/23 |
| 2016/0301590 A1* | 10/2016 | He | H04L 12/6418 |
| 2017/0163596 A1* | 6/2017 | Yan | H04L 43/0817 |
| 2018/0144381 A1* | 5/2018 | Rajesh | G06Q 30/0601 |

FOREIGN PATENT DOCUMENTS

| | | |
|---|---|---|
| JP | 2006-129533 A | 5/2006 |
| JP | 2013-157931 A | 8/2013 |

OTHER PUBLICATIONS

P. Mockapetris, "Domain Names—Implementation and Specification", Network Working Group, Request for Comments: 1035, Obsoletes: RFCs 882, 883, 973, ISI, Nov. 1987, 55 total pages.

B. Claise, "Cisco Systems NetFlow Services Export Version 9", Network Working Group, Request for Comments: 3954, Category: Informational, Oct. 2004, 33 total pages.

P. Phaal et al., "InMon Corporation's sFlow: A Method for Monitoring Traffic in Switched and Routed Networks", Network Working Group, Request for Comments: 3176, Category: Informational; Sep. 2001, 31 total pages.

Ignacio Bermudez et al., "DNS to the Rescue: Discerning Content and Services in a Tangled Web", Proceedings of the 2012 ACM Conference on Internet Measurement Conference, ACM, 2012, 14 total pages.

P.-A. Absil et al., Optimization Algorithms on Matrix Manifolds, 2007, ISBN 978-0-691-13298-3, 7 total pages.

Stuart J. Russell et al., Artificial Intelligence: A Modern Approach, 2003, ISBN 978-0-13-604259-4, 7 total pages.

* cited by examiner

| DOMAIN NAME | QUERY TYPE | NUMBER OF REQUESTS | NUMBER OF USERS |
|---|---|---|---|
| www.A.com | A | Q1 | U1 |
| www.B.com | A | Q2 | U2 |
| www.cdn.net | A | Q3 | U3 |

T2

| DOMAIN NAME | TTL | RECORD TYPE | RECORD DATA |
|---|---|---|---|
| www.A.com | 3600 | CNAME | www.cdn.net |
| www.B.com | 600 | CNAME | www.cdn.net |
| www.cdn.net | 30 | A | x.x.x.x |
| www.cdn.net | 30 | A | y.y.y.y |

| IP ADDRESS | NUMBER OF FLOWS | NUMBER OF USERS | NUMBER OF BYTES |
|---|---|---|---|
| x.x.x.x | F4 | U4 | B4 |
| y.y.y.y | F5 | U5 | B5 |

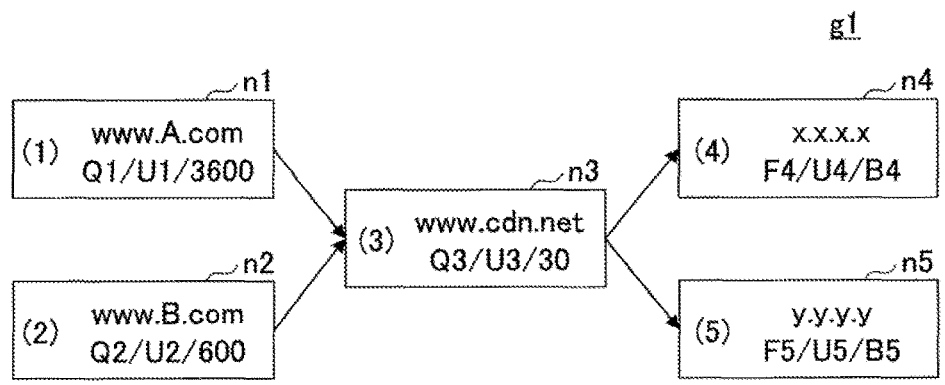

ESTIMATION DEVICE, ESTIMATION METHOD, AND RECORDING MEDIUM

TECHNICAL FIELD

The present invention relates to an estimation device, an estimation method, and a recording medium.

BACKGROUND ART

In recent years, in services having a large number of users on the Internet, represented by video distribution services, mechanisms have been introduced that decentralize content distributing servers geographically or over the network, to disperse the traffic, to disperse the load of the servers, and to reduce delay times. Especially, CDN (Contents Delivery Network) is a service that specializes in decentralizing content distributing servers, and many Internet service providers use CDN to distribute contents.

Here, it should be noted that IP addresses of content distributing servers may be shared by multiple services in a CDN. In such an operational form, if statistical information of traffic via the CDN needs to be known, it is difficult to uniquely identify a content distributing service associated with an IP address, based on information of the IP address included in flow information.

As a method for solving the above problem, DPI (Deep Packet Inspection) exists. Here, the term "DPI" refers to an analysis scheme of a packet including a payload field (the field corresponds to Layers 5-7 of OSI (Open Systems Interconnection) reference model) in general. By using DPI to extract a service name and/or an identifier included in the payload field of a packet, it is possible to identify the service name of the packet. For example, in the case of an HTTP (HyperText Transfer Protocol) packet, the service name of the packet can be identified by referring to the "HOST field" included in the HTTP header of the HTTP request packet.

However, if information for identifying a service is not included in the payload field of a packet, it is difficult to identify the service name by applying DPI to the packet. Also, if a packet is encrypted and the payload field cannot be referred to, it is difficult to apply DPI. Furthermore, since DPI captures all packets including the payload fields, and concurrently analyzes the packets, a high cost and a heavy load are imposed on measuring devices. Therefore, application of DPI to large-scale traffic is difficult in practice.

Meanwhile, as a scheme not using DPI though applicable to encrypted communication, a scheme has been proposed that compares a DNS (Domain Name System) log and flow information, to identify the service of a flow (see, for example, Non-patent document 4). In Non-patent document 4, a DNS log and flow information are collected at the same location. Based on that, a flow transmitted and received by a certain user is associated with a domain name related to an inquiry of a DNS packet transmitted and received by the user right before the flow, to estimate the domain name (namely, the identifier of a service). Based on the condition of collecting flow information and a DNS log at the same location, this scheme exhibits estimated precision of 75 to 97% for HTTP communication, and estimated precision of 74 to 96% for encrypted communication (TLS (Transport Layer Security)).

RELATED ART DOCUMENTS

Non-Patent Documents

Non-patent document 1: Domain Names: Implementation and Specification, https://www.ietf.org/rfc/rfc1035.txt Non-patent document 2: Cisco Systems NetFlow Services Export Version9, http://www.ietf.org/rfc/rfc3954.txt Non-patent document 3: InMon Corporation's sFlow: A Method for Monitoring Traffic in Switched and Routed Networks, https://www.ietf.org/rfc/rfc3176.txt Non-patent document 4: Bermudez, Ignacio N., et al, "DNS to the rescue: discerning content and services in a tangled web", In Proceedings of the 2012 ACM conference on Internet measurement conference, ACM, 2012, p. 413-426, 2012

Non-patent document 5: P-A. Absil, et all, (2007), Optimization Algorithms on Matrix Manifolds, pp. 10-14, ISBN 978-0-691-13298-3

Non-patent document 6: Russell, Stuart J., Norvig Peter, (2003), Artificial Intelligence: A Modern Approach (3rd ed.), Upper Saddle River, New Jersey: Prentice Hall, pp. 122-125, ISBN 978-0-13-604259-4

SUMMARY OF INVENTION

Problem to be Solved by the Invention

However, in an environment in which flow information and DNS logs are collected at different locations, it is difficult to compare a flow and a latest DNS packet. Therefore, it is difficult for the scheme described in Non-patent document 4 to estimate the amount of traffic by units of service names (for example, units of domain names), based on flow information and DNS logs that have been collected in such an environment.

The present invention has been made in view of the above, and has an object to ease a restriction relating to collecting information for estimating the amount of traffic for each domain name.

Means for Solving the Problem

Thereupon, in order to solve the problem, an estimation device includes a first measuring unit configured to measure a number of DNS requests for each domain name, based on DNS responses observed in a network; a second measuring unit configured, with respect to flows observed in the network, for each unit of the flows having a common IP address, to measure a sum of a number of the flows, and a sum of amounts of data; a generation unit configured to generate a graph in which a node represents a domain name or an IP address included in the DNS response, and an edge represents a correspondence relationship between the domain name and the IP address; a matrix estimation unit configured to estimate a transformation matrix representing a relationship between the amount of data measured by the second measuring unit for each IP address corresponding to the node of the graph, and the number of DNS requests measured by the first measuring unit for each domain name corresponding to the node other than an intermediate node of the graph; and a calculation unit configured, based on a relationship in which a value obtained by multiplying the number of requests for each of the domain names by the amount of data for each flow of each of the domain names, is equivalent to a value obtained by multiplying the transformation matrix by the amount of data for each of the IP addresses, to obtain the amount of data for each flow of each of the domain names, and to multiply the amount of data by the number of the DNS requests for each of the domain names, so as to calculate an estimate of the amount of data for each of the domain names.

Advantage of the Invention

It is possible to ease a restriction relating to collecting information for estimating the amount of traffic for each domain name.

BRIEF DESCRIPTION OF DRAWINGS

FIG. 4 is a diagram illustrating an example of a configuration of a DNS log storage unit;

FIG. 5 is a diagram illustrating an example of a configuration of a flow information storage unit;

FIG. 10 is a diagram illustrating assignment of numbers to nodes of a connected graph;

FIG. 11 is a diagram illustrating an example of an adjacency matrix based on a connected graph;

FIG. 12 is a diagram illustrating an example of extracting an initial value of a flow transformation matrix;

EMBODIMENTS OF THE INVENTION

Figure 1:
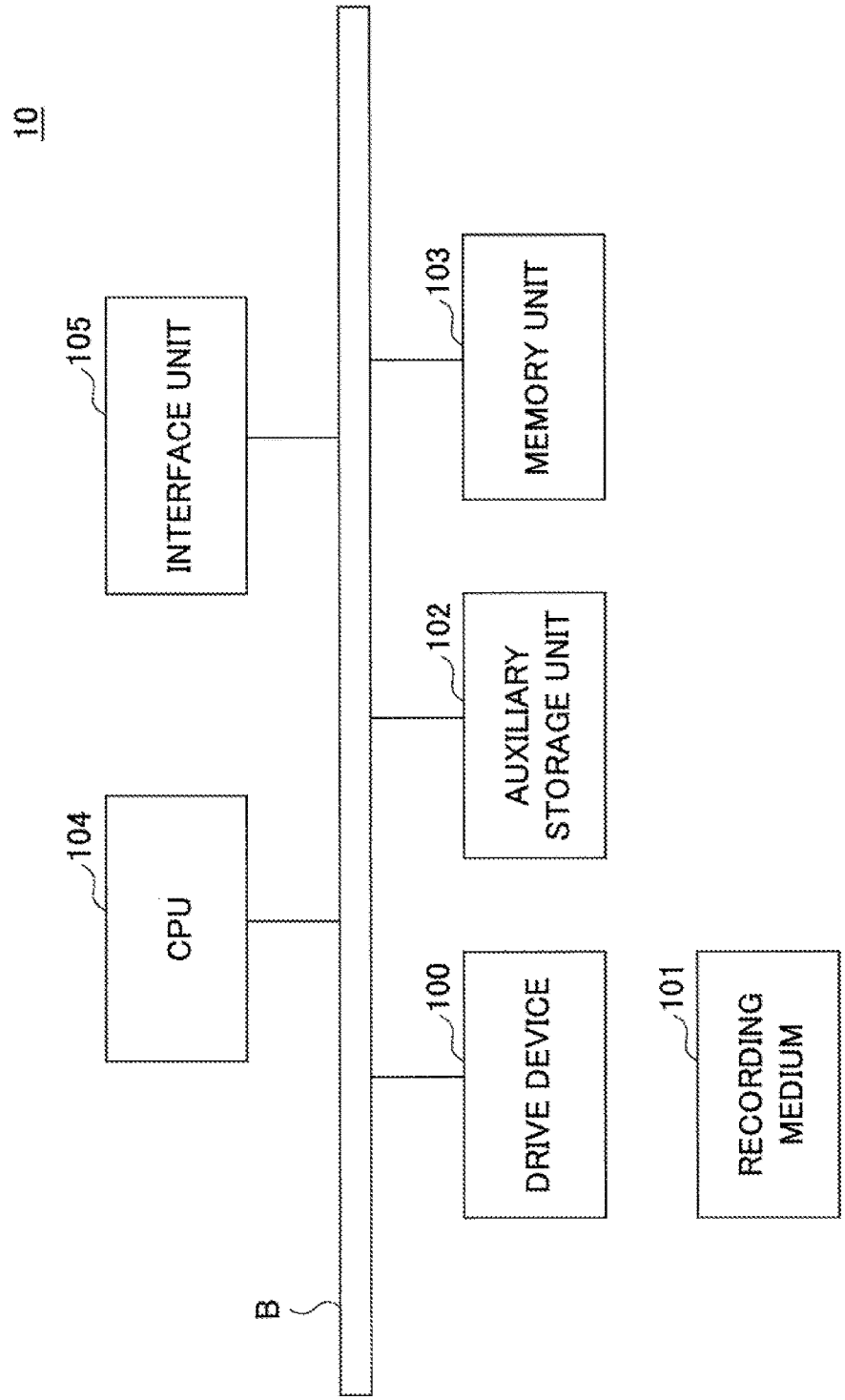
FIG. 1 is a diagram illustrating an example of a hardware configuration of an estimation device in a first embodiment.

In the following, embodiments of the present invention will be described with reference to the drawings. FIG. 1 is a diagram illustrating an example of a hardware configuration of an estimation device in a first embodiment. The estimation device 10 in FIG. 1 includes a drive device 100, an auxiliary storage unit 102, a memory unit 103, a CPU 104, and an interface unit 105, which are mutually connected by a bus B.

A program that implements processing on the estimation device 10 is provided with a recording medium 101 such as a CD-ROM. When the recording medium 101 storing the program is set in the drive unit 100, the program is installed into the auxiliary storage unit 102 from the recording medium 101 via the drive unit 100. However, installation of the program is not necessarily executed from the recording medium 101, but may also be downloaded from another computer via the network. The auxiliary storage unit 102 stores the installed program, and stores required files, data, and the like as well.

Upon receiving a command to activate the program, the memory unit 103 reads the program from the auxiliary storage unit 102, to load the program. CPU 104 executes the function which relates to the estimation device 10 according to the program stored in the memory unit 103. The interface unit 105 is used as an interface for connecting with the network.

Figure 2:
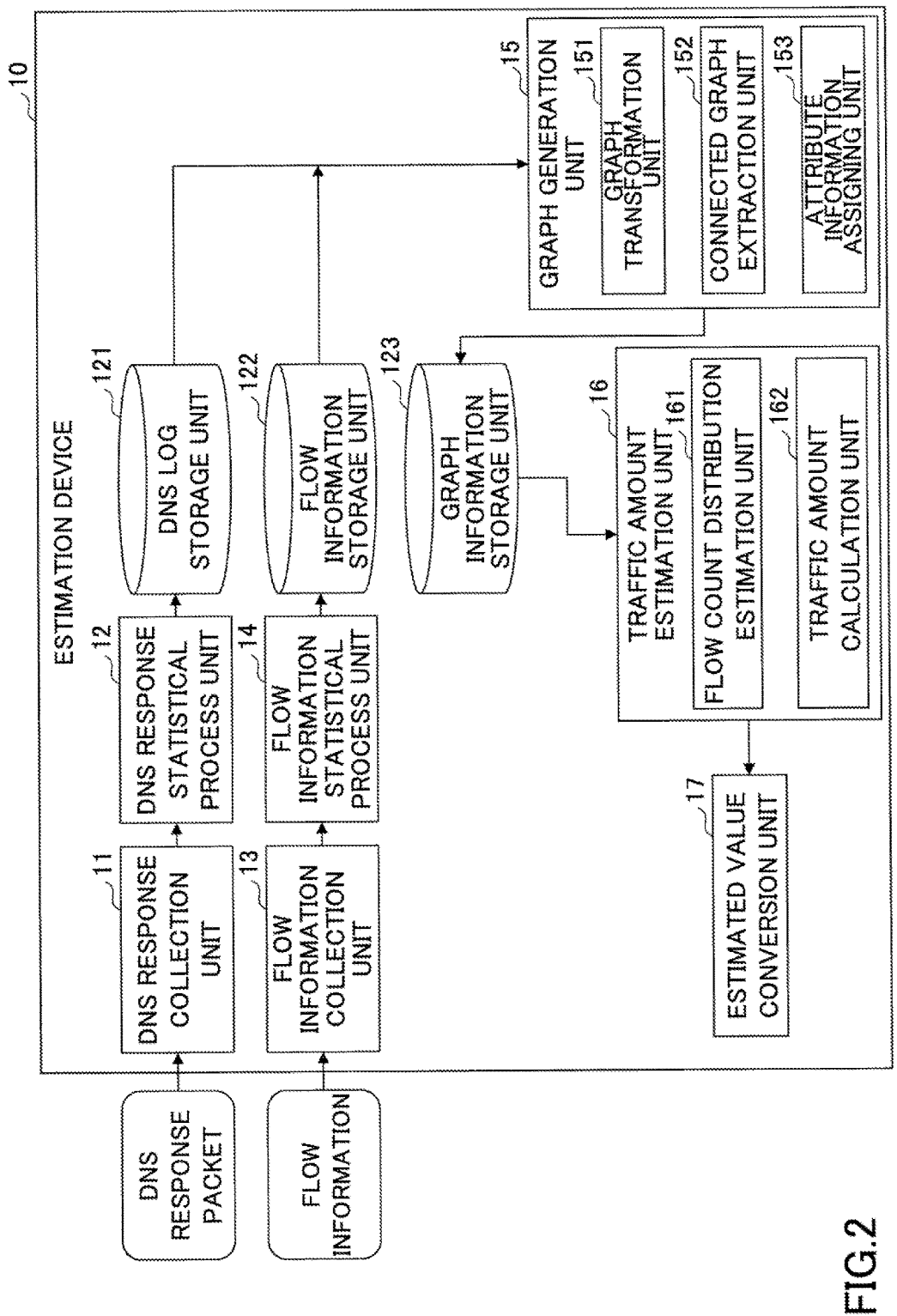
FIG. 2 is a diagram illustrating an example of a functional configuration of an estimation device in the first embodiment.

FIG. 2 is a diagram illustrating an example of a functional configuration of the estimation device in the first embodiment. In FIG. 2, the estimation device 10 includes a DNS response collection unit 11, a DNS response statistical process unit 12, a flow information collection unit 13, a flow information statistical process unit 14, a graph generation unit 15, a traffic amount estimation unit 16, and an estimated value conversion unit 17. These units are implemented by processes that one or more programs installed in the estimation device 10 cause the CPU 104 to execute. The estimation device 10 also uses a DNS log storage unit 121, a flow information storage unit 122, and a graph information storage unit 123. The DNS log storage unit 121, the flow information storage unit 122, and the graph information storage unit 123 can be implemented by using, for example, the auxiliary storage unit 102 in FIG. 1 or a memory unit that can be connected to the estimation device 10.

The DNS response collection unit 11 collects DNS (Domain Name System) response packets observed on the network. The method of collecting DNS response packets is not limited to a specific one. For example, DNS response packets may be collected by packet capturing executed by a DNS cache server or a network relay device (for example, a router or a switch).

The DNS response statistical process unit 12 executes a statistical process for DNS response packets collected for a certain period of time. The result of the statistical process is stored in the DNS log storage unit 121.

The flow information collection unit 13 collects information (referred to as "flow information", below) of flows (for example, a flow between a client and a server) observed on the network via the network. The server is, for example, a Web server or a server to distribute contents. A flow means a collection of packets that constitute a message having a meaning (for example, a request or a response). Therefore, packets constituting a flow have common destination and source IP addresses and a common port number. Flow information may be collected by using, for example, a flow information collection function installed in a router. Alternatively, the flow information collection unit 13 may capture packets, to generate flow information from the captured information. As communication protocols of flow information, NetFlow (see Non-patent document 2) and sFlow (see Non-patent document 3) may be cited. However, the collection method and the protocol of flow information are not limited to specific ones, as long as information can be obtained for "source IP address", "destination IP address", "number of flows", and "number of bytes". Note that in the embodiments, a flow is treated as a minimum unit of communication. However, a packet may be treated as a minimum unit of communication. In other words, a flow in the following description may be replaced by a packet.

The flow information statistical process unit 14 executes a statistical process for flow information collected for a certain period of time. The result of the statistical process is stored in the DNS log storage unit 121.

As is obvious from the above, the estimation device 10 in the embodiment may be connected to any network as long as both DNS response packets and flow information can be collected on the network. As examples of such a network, a backbone network of an ISP (Internet Service Provider), a network in a company, a network in a university, a network of a data center may be cited.

The graph generation unit 15 includes a graph transformation unit 151, a connected graph extraction unit 152, and an attribute information assigning unit 153. The graph transformation unit 151 converts information stored in the DNS log storage unit 121 into a directed graph. More specifically, the graph transformation unit 151 generates a directed graph in which a node represents a domain name (including an alias) or an IP address, and an edge represents a correspondence relationship of a domain name (including an alias) and an IP address, or two domain names.

The connected graph extraction unit 152 extracts a connected graph from a directed graph generated by the graph transformation unit 151. In other words, the connected graph extraction unit 152 decomposes a directed graph generated by the graph transformation unit 151 into one or more connected graphs as units. A connected graph consists of a set of nodes mutually reachable by tracing edges, and a set of the edges connecting the nodes. As an algorithm to decompose a directed graph, a generic algorithm based on graph theory may be used.

The attribute information assigning unit 153 assigns attribute information to each node of each connected graph. Each node represents a domain name or an IP address. Therefore, each node is assigned a domain name or an IP address as attribute information, which is the information stored in the DNS log storage unit 121 or the flow information storage unit 122.

Note that information representing a directed graph (connected graphs) generated by the graph generation unit 15 is stored in the graph information storage unit 123.

The traffic amount estimation unit 16 estimates the amount of traffic for each service, based on information representing a directed graph stored in the graph information storage unit 123. In general, each service is identified by a domain name. In other words, the domain name is different for each service. However, it is difficult to identify a service with an alias. This is because there is a possibility that multiple aliases may be set to a single service. Therefore, in the embodiment, the amount of traffic is estimated for each domain name excluding an alias. In FIG. 2, the traffic amount estimation unit 16 includes a flow count distribution estimation unit 161 and a traffic amount calculation unit 162. Functions of these units will be described later in detail.

The estimated value conversion unit 17 converts an internal representation of the amount of traffic of each domain name estimated by the traffic amount estimation unit 16, into a representation format that can be recognized by a human being, such as text. For example, the estimated value conversion unit 17 enables visualization of the amount of traffic for each domain, by a converted representation format.

Figure 3:
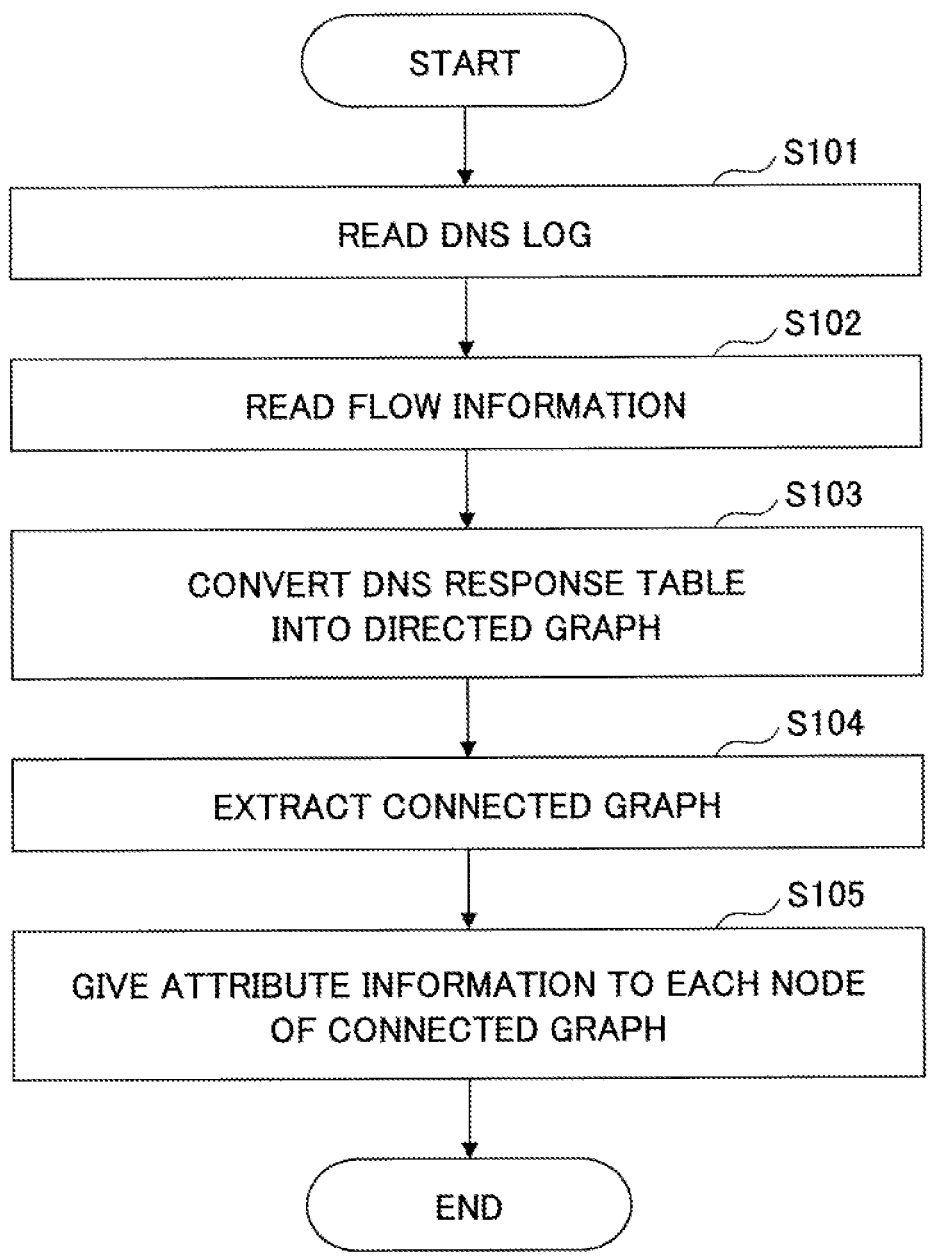
FIG. 3 is a flowchart illustrating an example of processing steps executed by a graph generation unit.

In the following, processing steps executed by the estimation device 10 will be described. FIG. 3 is a flowchart illustrating an example of processing steps executed by the graph generation unit. At a start time of the steps in FIG. 3, the log information storage unit stores statistical information measured by the DNS response statistical process unit 12 related to DNS response packets collected during a period t11, and the flow information storage unit 122 stores statistical information measured by the flow information statistical process unit 14 related to flow information collected during a period t12. Here, the period t11 and the period t12 may be the same or may be different. The period t11 and the period t12 being the same means the start time and the end time of the periods are the same, respectively. The period t11 and the period t12 being different means at least one of the start time and the end time of the periods is different.

At Step S101, the graph transformation unit 151 reads information (referred to as a "DNS log", below) stored in the DNS log storage unit 121.

FIG. 4 is a diagram illustrating an example of a configuration of the DNS log storage unit. As illustrated in FIG. 4, the DNS log storage unit 121 stores a DNS request table T1 and a DNS response table T2.

The DNS request table T1 stores information described in the Question section of a DNS response (namely, information related to the DNS request). Specifically, the DNS request table T1 stores the number of requests and the number of users for each combination of a domain name and a query type that have been observed.

The domain name (strictly, FQDN (Fully Qualified Domain Name), the same for domain names below) is a domain name set to be inquired in a DNS request (namely, a domain name to which name resolution is applied). The query type is a record set to be inquired in a DNS request. Here, "A" represents an A record. Although not illustrated in FIG. 4, if an AAAA record is to be inquired, the query type is set to "AAAA". The number of requests is the number of DNS responses that contain the Question section corresponding to "domain name" and "query type". Note that since a DNS response may be constituted with multiple DNS response packets, the number of DNS responses is set here. The number of users is the number of unique destination IP addresses of DNS response packets related to DNS responses that contain the Question section corresponding to "domain name" and "query type". In other words, the number of users is the number of unique DNS request sources. The number of requests and the number of users for each combination of "domain name" and "query type" are measured by the DNS response statistical process unit 12. Note that in FIG. 4, as a matter of convenience, values of the number of requests and the number of users are represented by symbols; however, the values are numerical values in practice.

The DNS response table T2 stores information related to A records, AAAA records, or CNAME records described in the Answer section of DNS responses. Specifically, the DNS response table T2 stores TTL (Time To Live) for each combination of domain name, record type, and record data that has been observed.

The domain name represents a domain name to which name resolution has been applied. The record type represents the type of a record included in a DNS response. The record data represents a value of a record included in a DNS response (namely, a value associated with the domain name). If the record is an A record or an AAAA record (namely, if the record type is "A" or "AAAA"), the value of the record data represents an IP address (an IP address of IPv4 or an IP address of IPv6). If the record is a CNAME record (namely, if the record type is "CNAME"), the value of the record data is an alias. TTL represents an estimated maximum expiration time of the cache of a domain name. A maximum expiration time is a value defined in a setting file of a zone file of an "authoritative DNS server", and set by a network administrator or the like. Since the TTL of each record in an observed DNS response packet represents remaining seconds at the moment when the DNS response packet was observed, it is not necessarily the maximum. Thereupon, the DNS response statistical process unit 12 measures a maximum value among observed TTLs for records duplicated in the domain name, record type, and record data, among A records and CNAME records included in DNS response packets observed during the period t11, to estimate the measurement result as the maximum TTL of the records.

Next, the graph transformation unit 151 reads statistical information of flow information (referred to as a "flow information log", below) stored in the flow information storage unit 122 (Step S102).

FIG. 5 is a diagram illustrating an example of a configuration of the flow information storage unit. As illustrated in FIG. 5, the flow information storage unit 122 stores the number of flows, the number of users, and the number of bytes for each IP address of an observed flow (namely, each unit of observed flows having a common IP address).

The IP address is the IP address of a server. The IP address of a server is the source IP address or the destination IP address of an observed flow. If the estimation device 10 is operated by an ISP or the like, the IP address of each client is assigned by the ISP. In other words, the estimation device 10 can maintain a list of IP addresses of clients. Based on such a list, the flow information statistical process unit 14 may determine which of the source IP address and the destination IP address is the IP address of the server.

The number of flows is the number of flows related to the "IP address". The number of users is the number of IP addresses of clients of the flows related to the "IP address". The number of bytes is a total of the number of bytes (amount of data) of the flows related to the "IP address".

The number of flows, the number of users, and the number of bytes are measured by the flow information statistical process unit 14. Note that in FIG. 5, as a matter of convenience, values of the number of flows, the number of users, and the number of bytes are represented by symbols; however, the values are numerical values in practice.

Next, the graph transformation unit 151 converts contents of a DNS response table T2 into a directed graph (Step S103).

Figure 6:
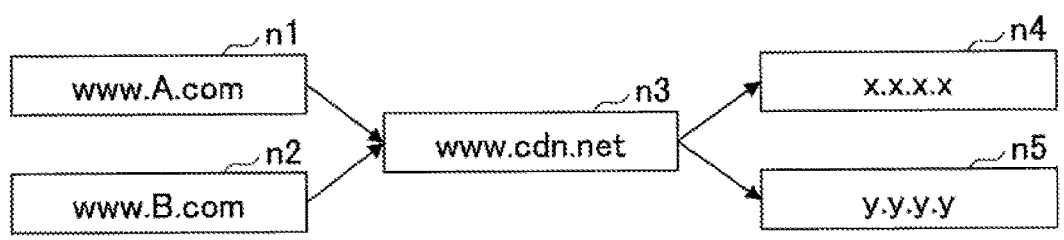
FIG. 6 is a diagram illustrating an example of a directed graph based on a DNS response table.

FIG. 6 is a diagram illustrating an example of a directed graph based on a DNS response table. A graph g1 in FIG. 6 corresponds to the DNS response table T2 illustrated in FIG. 4. In other words, each node of the graph g1 is a domain name or record data (an IP address or an alias) in the DNS response table T2. Specifically, a node n1, a node n2, and a node n3 are nodes of domain names. A node n4 and a node n5 are nodes of IP addresses.

Also, the graph g1 represents correspondence relationships of the domain names and the record data in the DNS response table T2, and includes directed edges, each of which has a direction from a domain name to record data.

Next, the connected graph extraction unit 152 decomposes the directed graph generated by the graph transformation unit 151 into units of connected graphs, and extracts each of the connected graphs (Step S104).

Figure 7:
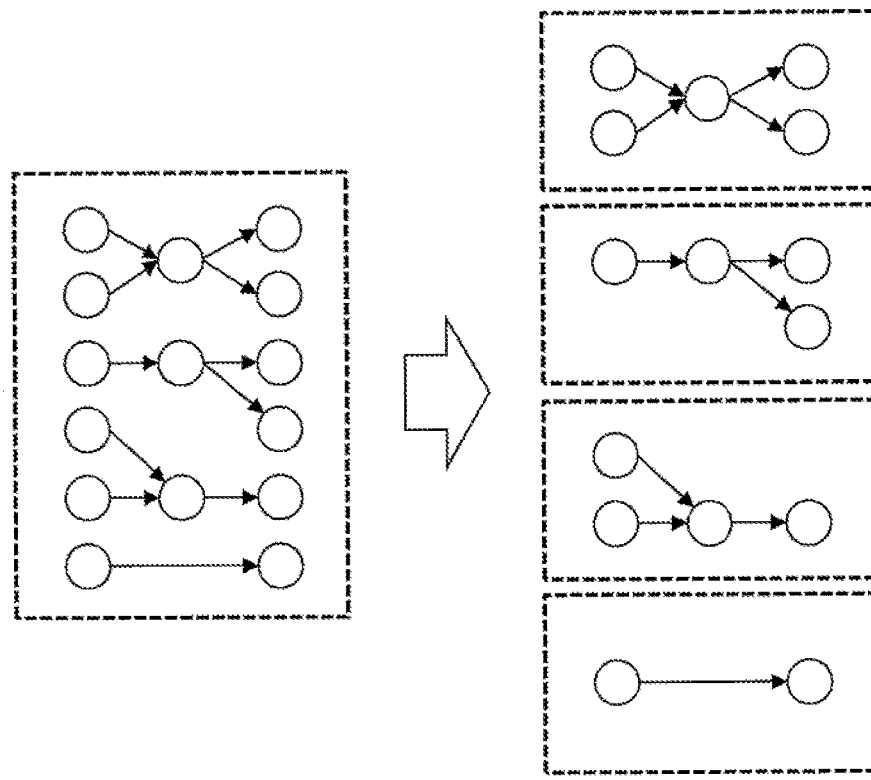
FIG. 7 is a diagram illustrating extraction of connected graphs.

FIG. 7 is a diagram illustrating extraction of connected graphs. Assuming that the directed graph generated at Step S103 is a graph surrounded by a rectangle of dashed lines on the left side in FIG. 7, four connected graphs are extracted as illustrated on the right side in FIG. 7. Note that in the embodiment, the graph g1 is extracted as a single connected graph as is.

Next, the attribute information assigning unit 153 assigns attribute information to each node of each connected graph (Step S105).

Figure 8:
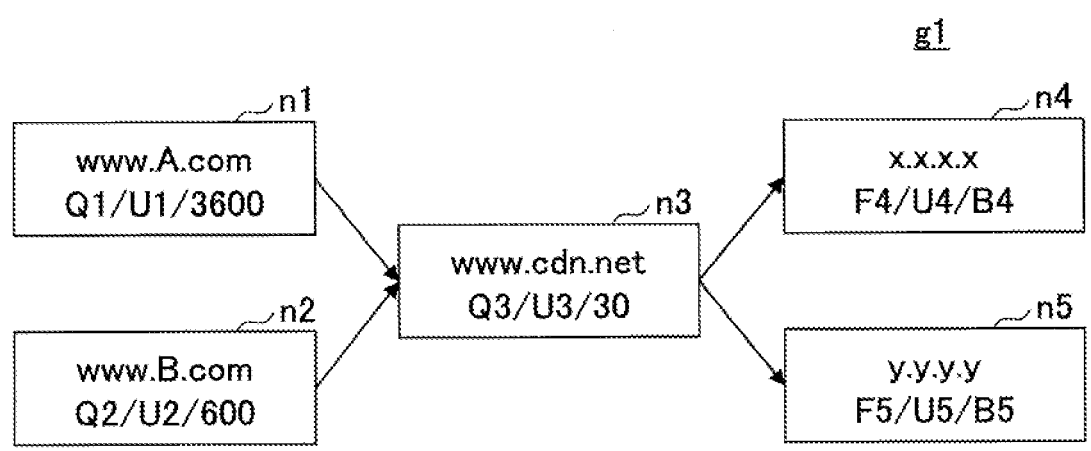
FIG. 8 is a diagram illustrating assignment of attribute information to each node of a connected graph.

FIG. 8 is a diagram illustrating assignment of attribute information to each node of a connected graph. As illustrated in FIG. 8, for each node of a domain name, the number of requests and the number of users of a record corresponding to the node in the DNS request table T1, and the TTL corresponding to the node in the DNS response table T2 are assigned. In FIG. 8, the assigned attribute information is illustrated in a format of "<number of requests>/<number of users>/<TTL>".

Meanwhile, for each node of an IP address, the number of flows, the number of users, and the number of bytes of a record corresponding to the node in the flow information storage unit 122 are assigned. In FIG. 8, the assigned attribute information is illustrated in a format of "<number of flows>/<number of users>/<number of bytes>".

Note that if times of the period t11 and the period t12 are mutually different, or if the time widths of the periods are mutually different, there is a possibility that the sum of the number of flows assigned to the nodes of IP addresses (the node n4 and the node n5) is not equivalent to the sum of the number of requests assigned to the nodes of domain names other than intermediate nodes (the node n1 and the node n2). In this case, there is a possibility that estimated precision of a flow transformation matrix H estimated by the flow count distribution estimation unit 161, which will be described later, is degraded. Thereupon, for each connected graph, the attribute information assigning unit 153 may normalize the number of requests of the nodes of domain names other than intermediate nodes so that the sum of the number of requests of the nodes amounts to 1, and may also normalize the number of flows of the nodes of IP addresses so that the sum of the number of flows of the nodes amounts to 1.

Note that information representing connected graphs generated by the graph generation unit 15 (referred to as "graph information", below) is stored in the graph information storage unit 123. The generation cycle of graph information may be set discretionarily as long as the cycle is longer than or equal to the cycle of a statistical process of DNS response packets executed by the DNS response statistical process unit 12, and is longer than or equal to the cycle of a statistical process of the flow information executed by the flow information statistical process unit 14. When a generation time of graph information (referred to as a "graph generation time", below) comes, the graph information may be generated by using a DNS log (a DNS request T1 and a DNS response table T2) most recently stored in the DNS log storage unit 121, and a flow information log most recently stored in the flow information storage unit 122.

Graph information generated at each graph generation time is associated with the graph generation time, and stored in the graph information storage unit 123. For example, denoting the graph generation time corresponding to the period t11 and the period t12 by a graph generation time t1, the graph information generated based on the DNS log during the period t11 and the flow information log during the period t12 is associated with the graph generation time t1, and stored in the graph information storage unit 123. Also, graph information representing connected graphs generated based on a DNS log stored in the DNS log storage unit 121 during a period t21, which is a certain period of time after the period t11, and a flow information log stored in the flow information storage unit 122 during a period t22, which is a certain period of time after the period t12, is associated with a graph generation time t2 corresponding to the period t21 and the period t22, and stored in the graph information storage unit 123.

Figure 9:
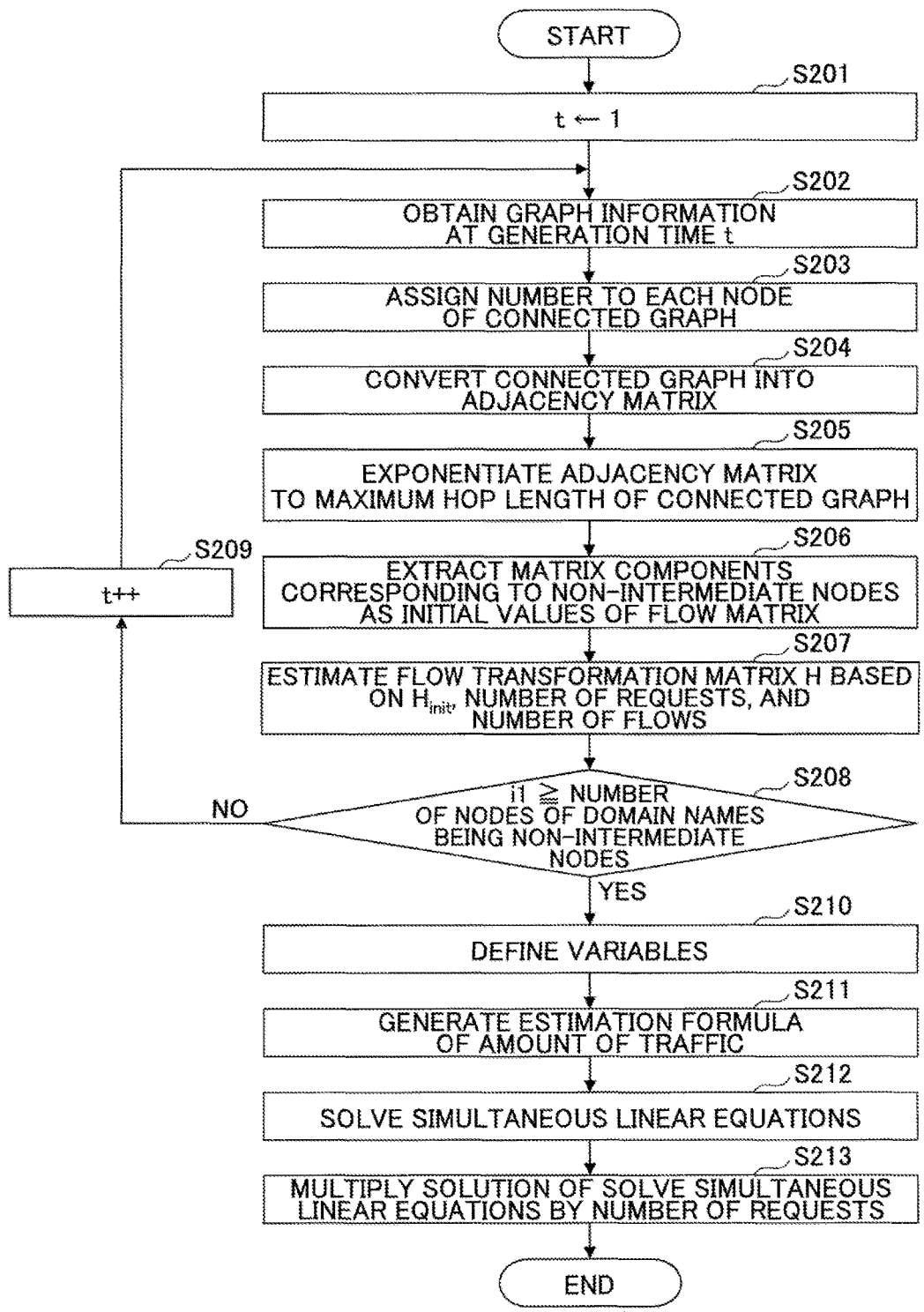
FIG. 9 is a flowchart illustrating an example of processing steps executed by a traffic amount estimation unit.

Next, processing steps executed by the traffic amount estimation unit 16 will be described. FIG. 9 is a flowchart illustrating an example of processing steps executed by the traffic amount estimation unit. Note that the process in FIG. 9 is executed for each connected graph. In the embodiment, the graph g1 in FIG. 6 is an object to be processed. Also, timing to execute the process in FIG. 9 may be asynchronous with timing to execute the process in FIG. 3.

At Step S201, the flow count distribution estimation unit 161 substitutes 1 for a variable t. The variable t is a variable for identifying a graph generation time of a graph to be processed, and the execution count of Steps S202 and after.

Next, the flow count distribution estimation unit 161 obtains graph information corresponding to the t-th graph generation time, from the graph information storage unit 123 (Step S202). Here, the graph information at the graph generation time t1 representing the graph g1 in FIG. 8 is obtained. In the following Steps S203-S207, the flow count distribution estimation unit 161 estimates a flow transformation matrix H, which represents a relationship between the number of requests for each domain name and the number of flows for each IP address, based on topological characteristics of the graph g1 and the attribute information assigned to each node of the graph g1 (namely, the DNS log and the flow information log). In the embodiment, what needs to be known for the graph g1 is the number of flows for each of the node n1 and the node n2, which are nodes of domain names other than intermediate nodes (namely, nodes not representing aliases), in order to obtain respective amounts of traffic for the nodes n1 and n2. Aiming at this purpose, the flow transformation matrix H is provided as a matrix to estimate how the number of flows known for the node n4 and the node n5 is to be distributed to the node n1 and the node n2. Note that in the case of a connected graph having a single node of a domain name other than intermediate nodes (for example, the second connected graph from the top and the fourth connected graph from the top on the right side in FIG. 7), the number of flows of the node of a domain name other than intermediate nodes can be obtained by simply adding up the numbers of flows of the nodes of IP addresses. Therefore, the subsequent steps do not need to be executed.

At Step S203, the flow count distribution estimation unit 161 assigns a number to each node of the graph g1. The way to assign numbers is not specifically limited as long as no number is duplicated for the nodes in the connected graph.

FIG. 10 is a diagram illustrating assignment of numbers to nodes of a connected graph. FIG. 10 illustrates an example in which numbers (1), (2), (3), (4), and (5) are assigned to nodes n1, n2, n3, n4, and n5 in this order.

Next, the flow count distribution estimation unit 161 converts the graph g1 into an adjacency matrix A (Step S204). The number of rows and the number of columns of the adjacency matrix A are equivalent, and the number of rows and the number of columns are equivalent to the count of the numbers assigned at Step S203 (namely, the number of nodes of the graph g1).

FIG. 11 is a diagram illustrating an example of an adjacency matrix based on a connected graph. In the adjacency matrix A illustrated in FIG. 11, the row direction represents source sides (side on which a directed edge goes out), and the column direction represents sink sides (side on which a directed edge comes in). As the method of converting into an adjacency matrix A, basically, a generic method generally known to the public may be used. However, the adjacency matrix A in the embodiment is extended in the following respects (a) and (b), compared to a general adjacency matrix. (a) If a directed edge exists from a node i to a node j, and the indegree of the node j is n, $A_{ij}=1/n$. (b) If the indegree of the node i is 0, $A_{ii}=1$ for a diagonal component corresponding to the node i.

Note that a component having the value of 0 is denoted by a blank in FIG. 11 as a matter of convenience.

For example, values of $A_{13}$, $A_{23}$, $A_{34}$, and $A_{35}$ are assigned based on the above (a). In other words, $A_{13}$ and $A_{23}$ correspond to a directed edge from the node n1 to the node n3, and a directed edge from the node n2 to the node n3, respectively, and the indegree of the node n3 (the number of directed edges coming into the node n3) is 2. Therefore, the value of $A_{13}$ and $A_{23}$ is ½=0.5. Also, $A_{34}$ and $A_{35}$ correspond to a directed edge from the node n3 to the node n4, and a directed edge from the node n3 to the node n4, respectively, and the indegree is 1 for both of the node n4 and the node n5. Therefore, the value of $A_{13}$ and $A_{23}$ is ⅟1=1.

Meanwhile, values of $A_{11}$ and $A_{22}$ are assigned based on the above (b). In other words, the indegree is 0 for both of the node n1 and the node n2. Therefore, the value of $A_{11}$ and $A_{22}$ is set to 1.

Next, the flow count distribution estimation unit 161 obtains a matrix A' by exponentiating the adjacency matrix A to the number corresponding to the maximum hop length of the graph g1 (Step S205). In other words, the flow count distribution estimation unit 161 calculates $A'=A^n$ (where n is the maximum hop length of the graph g1). Note that the reason for exponentiating the adjacency matrix A to n is detailed in general graph theory.

Next, the flow count distribution estimation unit 161 extracts components from the matrix A' that correspond to combinations of rows corresponding to nodes of domain names other than intermediate nodes, and columns corresponding to nodes of IP addresses in the graph g1 (Step S206). A matrix constituted with the extracted components is set as an initial value $H_{init}$ of the flow transformation matrix H.

FIG. 12 is a diagram illustrating an example of extracting an initial value of the flow transformation matrix. FIG. 12 illustrates an example in which components in the overlap of rows (1)-(2) and columns (4)-(5) in the matrix A' are extracted as the initial value $H_{init}$.

Next, the flow count distribution estimation unit 161 estimates a flow transformation matrix H, based on the initial value $H_{init}$, the number of requests assigned to nodes of domain names corresponding to the rows of the initial value $H_{init}$ in the graph g1 (FIG. 8), and the number of flows assigned to nodes corresponding to IP addresses corresponding to the columns of the initial value $H_{init}$ in the graph g1 (Step S207). The flow transformation matrix H is not settled uniquely due to noise or the like included in the number of requests and the number of flows. Therefore, in the embodiment, a local solution of the flow transformation matrix H is estimated by solving an optimization problem. For example, the following formula (1) is an example of formulation in the case of solving such an optimization problem.

$$H = \mathrm{argmin}_H (\|Y - HX\|_F + \alpha \|H - H_{init}\|_F) \quad (1)$$

$$X = \begin{pmatrix} F4 \\ F5 \end{pmatrix} Y = \begin{pmatrix} Q1 \\ Q2 \end{pmatrix}$$

Here, $\|\ldots\|_F$ represents the Frobenius norm. Also, α is a parameter to determine a degree of importance of an initial state (the initial value $H_{init}$). In other words, the value of α is set to a large value if a solution for the flow transformation matrix H is desired to be close to the initial value $H_{init}$ as much as possible.

Furthermore, a vector X represents the numbers of flows (F4 and F5) assigned to nodes of IP addresses (node n4 and node n5) corresponding to the columns of the initial value $H_{init}$ in the graph g1. A vector Y represents the numbers of requests (Q1 and Q2) assigned to nodes of domain names (node n1 and node n2) corresponding to the rows of the initial value $H_{init}$ in the graph g1.

In other words, the flow transformation matrix H is a matrix for converting the number of flows for each IP address into the number of flows for each domain name.

Note that to solve the optimization problem, the initial value of the flow transformation matrix H may be set to any value. For example, a matrix having the component values all at 0 may be set as the initial value. In this case, Steps S203-S206 do not need to be executed. However, obtaining the initial value $H_{init}$ as in the embodiment raises a possibility to obtain a solution for the flow transformation matrix H that is in accordance with the state of the graph g1 (namely, the observed state of the DNS response packets and flow information). As a result, improvement can be expected for estimated precision of the amount of traffic for each domain name.

Note that Formula (1) is an example of formulation for solving the problem as an optimization problem, and by deriving an update formula for the flow transformation matrix H from Formula (1), a local solution can be obtained. As another example, a scheme for solving an optimization problem such as the hill-climbing method may be applied (see, for example, Non-patent document 6).

Next, the flow count distribution estimation unit 161 determines whether the value of the variable t has reached the number of nodes of domain names other than intermediate nodes of the graph g1 (Step S208). If the value of the variable t1 has not reached the number of such nodes (NO at Step S208), the flow count distribution estimation unit 161 adds 1 to the variable t (Step S209), and repeats Steps S202 and after. In other words, Steps S202 and after are executed for the next graph generation time. In the embodiment, the number of such nodes is two, the node n1 and the node n2. Therefore, for example, Steps S202 and after are executed for the generation time t2, and a flow transformation matrix H is generated with respect to the generation time t2.

In this way, the flow transformation matrix H is generated for the number of nodes of domain names other than intermediate nodes of the graph g1, based on graph information for graph generation times that are mutually different. For example, in the embodiment, the flow transformation matrix H1 with respect to the graph generation time t1 and the flow transformation matrix H2 with respect to the graph generation time t2 are generated. The reason will be described later.

At Steps S210 and after, the traffic amount calculation unit 162 calculates an estimate of the amount of traffic for each domain name, by using the flow transformation matrix H and the like.

At Step S210, the traffic amount calculation unit 162 defines variables for data whose value is unknown (namely, data for which the value is to be estimated), and data whose value is known (namely, data assigned to each node of the graph g1 as the attribute information). In the embodiment, variables are defined as follows.

[Known Data]
Ra: the number of bytes for each flow of each IP address;
Sa: the number of flows of each IP address;
Ba: the number of bytes of each IP address; and
Sd: the number of flows of each domain name. Note that the number flows of each domain name Sd is not obtained from a DNS log, but can be approximated by the number of requests, which is set as the value.

[Unknown Data]
Rd: the number of bytes for each flow of each domain name; and
Bd: the number of bytes of each domain name. In the embodiment, values of the known data are as follows.
Ra=(B4/F4, B5/F5)
Sa=(F4, F5)
Ba=(B4, Q5)
Sd=(Q1, Q2)

Note that since the number of nodes of domain names other than intermediate nodes with respect to the graph g1 is 2, the number of dimensions of Rd and Bd is 2.

Next, the traffic amount calculation unit 162 generates an estimation formula (2) for the amount of traffic by using a flow transformation matrix H, in which the unknown variable is the number of bytes for each flow of each domain name Rd (Step S211).

$$Sd \otimes \underline{Rd} = H \cdot Sa \otimes Ra \qquad (2)$$
$$= H \cdot Ba$$

*where $\otimes$ is a component-wise product of vectors, and defined as follows for vectors A and B:

$$A \otimes B = A \cdot B^T$$

The number of unknown variables included in Rd is equivalent to the number of domain names other than intermediate nodes of each adjacency matrix. Simultaneous linear equations are obtained by developing the estimation formula (2).

Note that simultaneous linear equations are generated for the number of dimensions of Rd. Specifically, each flow transformation matrix H, which has been generated for each node of a domain name other than an intermediate node, is used for generating one of the simultaneous linear equations. Therefore, in the embodiment, the following two simultaneous linear equations (3) are generated for the graph generation time t1 and the graph generation time t2.

$$t1: Sd1 \otimes Rd = H1 \cdot Ba1$$
$$t2: Sd2 \otimes Rd = H2 \cdot Ba2 \qquad (3)$$

In simultaneous linear equations (3), Sd1, H1, and Ba1 are Sd, a flow transformation matrix H, and Ba corresponding to the graph generation time t1, respectively. Sd2, H2, and Ba2 are Sd, a flow transformation matrix H, and Ba corresponding to the graph generation time t2, respectively. In this way, since the flow transformation matrix, Sd and Ba are required for every node of a domain name other than an intermediate node of the graph g1, Steps S202-S207 are repeated by the number of such nodes.

It is assumed here that Rd is invariable or changes little with respect to time. Such an assumption is considered appropriate in general. This is because the number of bytes for each flow depends on a service, and dependency on time is low. For example, comparing a video site with a site simply providing text information, the video site is naturally considered to have a greater number of bytes of a flow, and it is highly likely that the relationship is invariable over time. Therefore, the embodiment is suitable for an environment where dependency on time is low in terms of the number of bytes for a flow.

Next, the traffic amount calculation unit 162 solves the simultaneous linear equations (3), to obtain Rd (Step S212). However, Rd may not be settled uniquely due to influence of noise in DNS response packets and flow information that have been observed. In that case, the method of obtaining a local solution according to Non-patent document 6 may be used.

Next, the traffic amount calculation unit 162 obtains Bd by multiplying Sd by Rd obtained at Step S212 (Step S213). In other words, the following calculation is executed.

$$Bd = Sd \otimes Rd$$

where Bd represents the amount of traffic for each domain name, which is an object.

Note that as an estimation method of the amount of traffic for each domain name, another method other than the above may be adopted. For example, element technologies such as an optimization algorithm as in Non-patent document 5 may be used.

Figure 13:
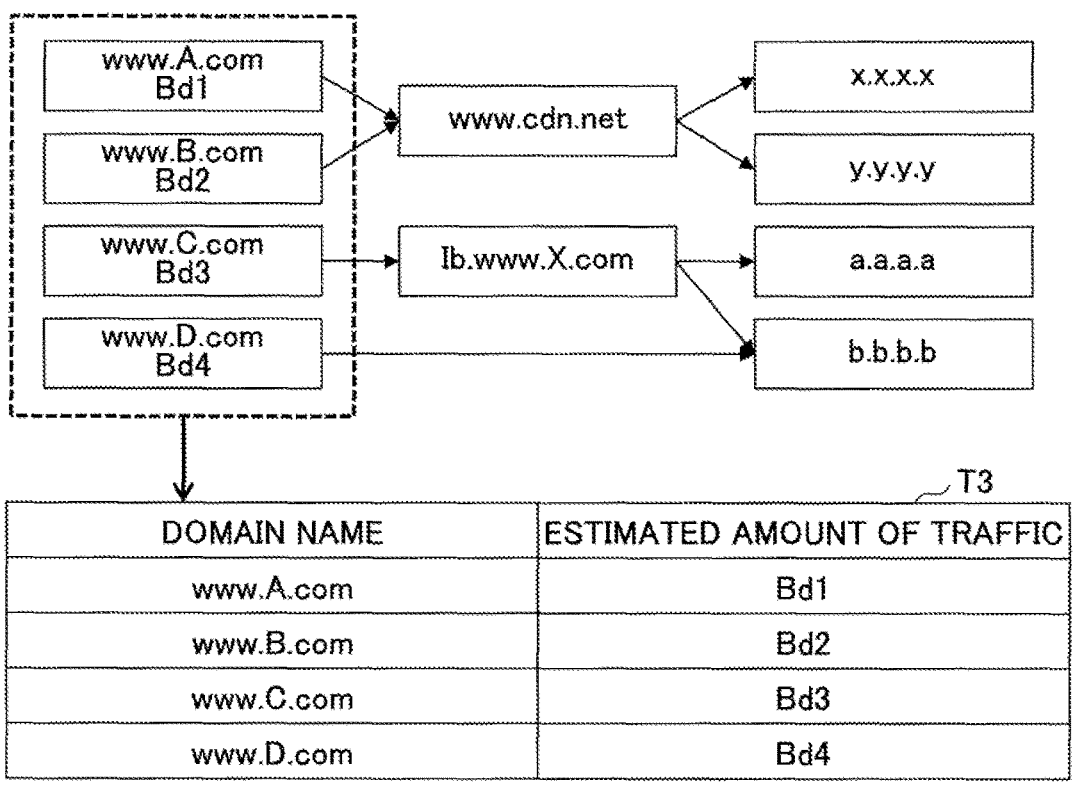
FIG. 13 is a diagram illustrating an example of output of an estimated result of the amount of traffic for each domain name.

The estimated value conversion unit 17 outputs the amount of traffic for each domain name estimated as above, for example, in a format as illustrated in FIG. 13.

FIG. 13 is a diagram illustrating an example of output of an estimated result of the amount of traffic for each domain name. FIG. 13 illustrates a graph g2 in addition to the graph g1. Assume that the graph g2 is a connected graph extracted along with the graph g1. In this case, the amount of traffic is obtained for four domain names being non-intermediate nodes. The estimated value conversion unit 17 enables visualization of these amounts of traffic, for example, in a format of a table T3 as illustrated. The table T3 illustrates the amount of estimated traffic for each domain name. Note that the arrangement order of rows in the table T3 may be obtained by sorting by the amount of estimated traffic. In other words, the rankings of the amounts of estimated traffic for domain names may be output. The output form is not limited to a predetermined one. For example, it may be displayed on a display, printed on a printer, or transmitted to another computer via the network.

As described above, according to the first embodiment, input data (DNS logs and flow information logs), to which a statistical process has been applied, is converted into a directed graph by the graph generation unit 15, and making use of the characteristics of the directed graph, the traffic amount estimation unit 16 estimates the amount of traffic for each domain name based on the statistical information. During the course of these series of processes, association based on units of individual users or packets is not required. In other words, in the embodiment, each DNS response packet and each flow information item are not associated one by one, but statistical information of DNS response packets and statistical information of flow information are associated to estimate the amount of traffic for each domain name. Therefore, the embodiment can handle a case in which differences in collection locations and collection times of DNS response packets and flow information, result in different user groups who transmit respective DNS logs and flow information. Therefore, it is possible to ease a restriction relating to collecting information for estimating the amount of traffic for each domain name.

As a result, for example, in a large-scale network having a restriction that DNS response packets and flow information are inevitably collected in different locations and times, the administrator can easily grasp the amount of traffic by units of services, and can expect applicational effects including reduced network monitoring and operational cost, expedited isolation of a cause of congestion on communication lines, and optimized investment in network equipment.

Next, a second embodiment will be described. In the second embodiment, points different from the first embodiment will be described. Points not specifically mentioned in the second embodiment may be the same as in the first embodiment.

The traffic amount calculation unit 162 in the second embodiment generates the following estimation formula (4) at Step S211 in FIG. 9.

$$Sd \otimes \underline{Rd} = Sa \otimes Ra \qquad (4)$$
$$= Ba$$

In other words, the flow transformation matrix H is not used in the second embodiment. Therefore, Steps S201-S208 in FIG. 9 do not need to be executed. The process in FIG. 3 does not need to be executed, either. In this case, the simultaneous linear equations for graph generation times are as follows.

$$t1: Sd1 \otimes Rd = Ba1$$

$$t2: Sd3 \otimes Rd = Ba2$$

$$t3: Sd3 \otimes Rd = Ba3$$

The other matters may be the same as in the first embodiment.

The second embodiment is preferably applied to a case where sufficient observed data (DNS response packets and flow information) has been accumulated. This is because the more the observed data is available, the more it is possible to avoid degradation of the estimated precision of the amount of traffic for each domain name becoming worse, even if the flow transformation matrix H is not used.

Next, a third embodiment will be described. In the third embodiment, points different from the first or second embodiment will be described. Points not specifically mentioned in the third embodiment may be the same as in the first or second embodiment.

Figure 14:
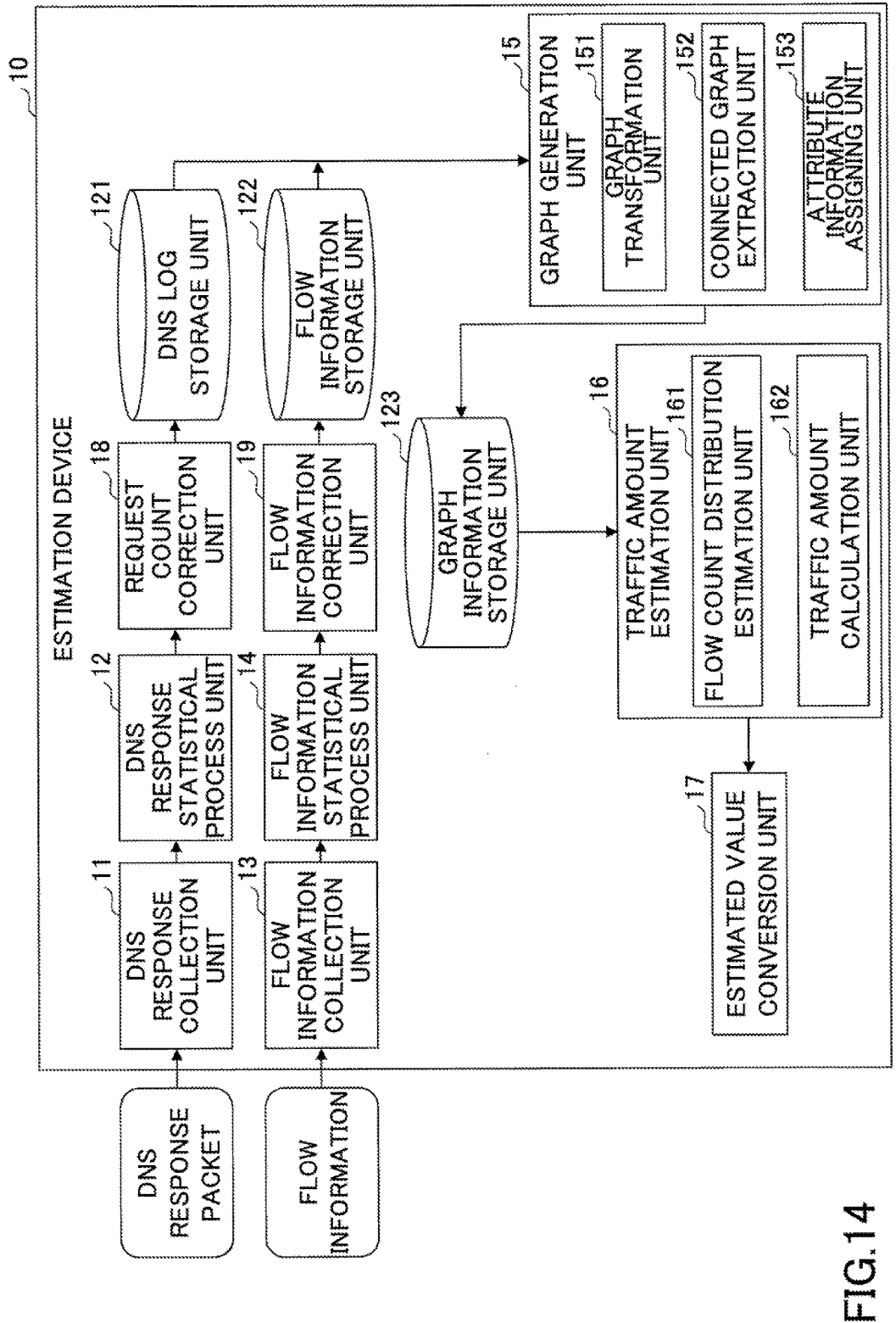
FIG. 14 is a diagram illustrating an example of a functional configuration of an estimation device in a third embodiment.

FIG. 14 is a diagram illustrating an example of a functional configuration of an estimation device in the third embodiment. In FIG. 14, the same codes are assigned to the same units as in FIG. 2, and their description is omitted. In FIG. 14, the estimation device 10 further includes a request count correction unit 18 and a flow information correction unit 19.

By using the number of requests and TTL included in a DNS log, the request count correction unit 18 estimates the number of accesses or the number of flows to a server by a client, and replaces the number of requests in the DNS log by the estimated result. In other words, the number of requests included in the DNS log is different from the number of accesses to the server by the client, or the number of flows. Normally, when a user accesses a certain URL (Uniform Resource Locator), for example, to browse a Web page, name resolution is tried for a domain name included in the URL. However, in general, since a mechanism of caching a DNS response (stub resolver) exists in a terminal of a user, the number of observed DNS response packets is significantly less than the number of accesses to a Web page made by clients.

Thereupon, the request count correction unit 18 estimates the number of real accesses to a server using TTL and the number of requests. For example, the number of requests may be corrected by adding a result of estimation of the count of name resolution executed in a period specified by the TTL, to the original number of requests.

Therefore, in the third embodiment, the number of requests in a DNS request table T1 as illustrated in FIG. 4 is a corrected value.

Meanwhile, the flow information correction unit 19 corrects the number of flows, the number of users, and the number of bytes in a flow information log. In other words, a general network device such as a router collects flow information by regular sampling for performance reasons. For example, flow information is collected for one in a thousand packets. The number of flows, the number of users, and the number of bytes based on flow information sampled as such are smaller than real values.

Thereupon, the flow information correction unit 19 estimates the number of flows, the number of users, and the number of bytes without sampling, and corrects the contents of the flow information log by the estimated result. For example, correction may be based on the sampling rate. If the sampling rate is $1/1000$, the number of flows, the number of users, and the number of bytes may be corrected by multiplying the respective values by 1000. Correction may be executed by another method.

Therefore, in the third embodiment, the number of requests in a DNS response table T2 illustrated in FIG. 4 is a corrected value.

As described above, according to the third embodiment, since the number of requests in a DNS log and a value in a flow information log can be brought close to real values, improvement can be expected for estimated precision of the amount of traffic for each domain name.

Note that in the above embodiments, the DNS response statistical process unit 12 is an example of a first measuring unit. The flow information statistical process unit 14 is an example of a second measuring unit. The graph generation unit 15 is an example of a generation unit. The flow count distribution estimation unit 161 is an example of a matrix estimation unit. The traffic amount calculation unit 162 is an example of a calculation unit.

As above, the embodiments of the present invention have been described in detail. Note that the present invention is not limited to such specific embodiments, but various variations and modifications may be made within the scope of the subject matters of the present invention described in the claims.

The present patent application claims priority based on Japanese Patent Application No. 2015-028744, filed on Feb. 17, 2015, and the entire contents of the Japanese Patent Application are incorporated herein by reference.

LIST OF REFERENCE SYMBOLS 10 estimation device
11 DNS response collection unit
12 DNS response statistical process unit
13 flow information collection unit
14 flow information statistical process unit
15 graph generation unit
16 traffic amount estimation unit
17 estimated value conversion unit
18 request count correction unit
19 flow information correction unit
100 drive device
101 recording medium
102 auxiliary storage unit
103 memory unit
104 CPU
105 interface unit
121 DNS log storage unit
122 flow information storage unit
123 graph information storage unit
151 graph transformation unit
152 connected graph extraction unit
153 attribute information assigning unit
161 flow count distribution estimation unit
162 traffic amount calculation unit
B Bus

The invention claimed is:

1. An estimation device, which is configured to connect to a network when both DNS response packets and flow information can be collected on the network, comprising:
processing circuitry configured to
measure a number of DNS requests for each of a plurality of domain names, based on DNS responses observed in the network;
with respect to flows observed in the network, for each unit of the flows having a common IP address from a plurality of IP addresses, measure a sum of a number of the flows, and a sum of amounts of data as an amount of data for each IP address;
generate a graph in which a node represents a domain name or an IP address included in the DNS response, and an edge represents a correspondence relationship between the domain name and the IP address included in the DNS response;
estimate a transformation matrix representing a relationship between the amount of data measured for each IP address included in a respective DNS response corresponding to the node of the graph, and the number of DNS requests measured for each of the plurality of domain names corresponding to the node other than an intermediate node of the graph; and
based on a relationship in which a value, obtained by multiplying the number of requests for each of the domain names by an amount of data for each flow of each of the domain names, is equivalent to a value obtained by multiplying the transformation matrix by the amount of data for each of the IP addresses, obtain the amount of data for each flow of each of the domain names, and multiply the amount of data for each flow of each of the domain names by the number of the DNS requests for each of the domain names, so as to calculate an estimate of the amount of data for each of the domain names.

2. The estimation device as claimed in claim 1, wherein processing circuitry
converts the graph into an adjacency matrix,
exponentiates the adjacency matrix to a number corresponding to a maximum hop length of the adjacency matrix,
extracts from the exponentiated adjacency matrix each component corresponding to a combination of the node of the domain name, other than the intermediate node, and the node of the IP address, as a component of an initial value of the transformation matrix, and
estimates the transformation matrix, based on the extracted initial value, the amount of data measured for each of the IP addresses corresponding to the nodes of the graph, and the number of the DNS requests measured for the domain names corresponding to the nodes other than the intermediate nodes of the graph,
wherein in the adjacency matrix, a diagonal component corresponding to a node whose it degree is 0 is set to have a value of 1, and a component corresponding to an edge coming into a node whose indegree is greater than or equal to 1 is set to have a value obtained by dividing 1 by the indegree.

3. The estimation device as claimed in claim 1, wherein the processing circuitry generates one or more connected graphs, in each of which a node represents a domain name or an IP address included in the DNS response, and an edge represents a correspondence relationship between the domain name and the IP address, estimates the transformation matrix for each of the connected graphs, and calculates the estimate for each of the domain names corresponding to the nodes other than the intermediate nodes, for each of the connected graphs.

4. An estimation device, which is configured to connect to a network when both DNS response packets and flow information can be collected on the network, comprising:

processing circuitry configured to measure a number of DNS requests for each of a plurality of domain names, based on DNS responses observed in the network;

with respect to flows observed in the network, for each unit of the flows having a common IP address from a plurality of IP addresses, measure a sum of a number of the flows, and a sum of amounts of data as an amount of data for each IP address;

based on a relationship in which a value obtained by multiplying the number of requests for each of the domain names by an amount of data for each flow of each of the domain names, is equivalent to the amount of data for each of the IP addresses, obtain the amount of data for each flow of each of the domain names, and multiply the amount of data for each flow of each of the domain names by the number of the DNS requests for each of the domain names, so as to calculate an estimate of the amount of data for each of the domain names.

5. An estimation method, executed by an estimation device which is configured to connect to a network when both DNS response packets and flow information can be collected on the network, the method comprising:

a first measuring step for measuring a number of DNS requests for each of a plurality of domain names, based on DNS responses observed in the network;

a second measuring step for measuring, with respect to flows observed in the network, for each unit of the flows having a common IP address from a plurality of IP addresses, a sum of a number of the flows, and a sum of amounts of data as an amount of data for each IP address:

a generation step for generating a graph in which a node represents a domain name or an IP address included in the DNS response, and an edge represents a correspondence relationship between the domain name and the IP address included in the DNS response;

a matrix estimation step for estimating a transformation matrix representing a relationship between the amount of data measured by the second measuring step for each IP address included in a respective DNS response corresponding to the node of the graph, and the number of DNS requests measured by the first measuring step for each of the plurality of domain names corresponding to the node other than an intermediate node of the graph; and a calculation step for, based on a relationship in which a value, obtained by multiplying the number of requests for each of the domain Mines by an amount of data for each flow of each of the domain names, is equivalent to a value obtained by multiplying the transformation matrix by the amount of data for each of the IP addresses, obtaining the amount of data for each flow of each of the domain names, and multiplying the amount of data for each flow of each of the domain names by the number of the DNS requests for each of the domain names, so as to calculate an estimate of the amount of data for each of the domain names.

6. An estimation method, executed by an estimation device which is configured to connect to a network when both DNS response packets and flow information can be collected on the network, the method comprising:

a first measuring step for measuring a number of DNS requests for each of a plurality of domain names, based on DNS responses observed in the network;

a second measuring step for measuring, with respect to flows observed in the network, for each unit of the flows having a common IP address from a plurality of IP addresses, a sum of a number of the flows, and a sum of amounts of data as an amount of data for each IP address:

a calculation step for, based on a relationship in which a value, obtained by multiplying the number of requests for each of the domain names by an amount of data for each flow of each of the domain names is equivalent to the amount of data for each of the IP addresses, obtaining the amount of data for each flow of each of the domain names, and multiplying the amount of data for each flow of each of the domain names by the number of the DNS requests for each of the domain names, so as to calculate an estimate of the amount of data for each of the domain names.

7. A non-transitory computer-readable recording medium having a program stored therein for causing a computer to function as the estimation device as claimed in claim 1.

* * * * *